United States Patent [19]

van Opstal et al.

[11] Patent Number: 4,927,544

[45] Date of Patent: May 22, 1990

[54] PROCESS FOR THE CONTINUOUS REMOVAL OF A GUM PHASE FROM TRIGLYCERIDE OIL

[75] Inventors: Martin van Opstal, Izegem; Frans Dewulf, Lauwe; Bernard Cleenewerck, Wachtebeke, all of Belgium; Ernst Weber, Oelde, Fed. Rep. of Germany

[73] Assignee: N.V. Vandemoortele International, Kortrijk, Belgium

[21] Appl. No.: 322,860

[22] Filed: Mar. 14, 1989

[30] Foreign Application Priority Data

Jul. 6, 1988 [EP] European Pat. Off. ........ 88110751.0

[51] Int. Cl.[5] .............................................. B01D 21/26

[52] U.S. Cl. .................................... 210/712; 210/787; 210/805; 260/424

[58] Field of Search ............... 210/787, 712, 805, 806, 210/708, 749; 260/403, 424, 428

[56] References Cited

U.S. PATENT DOCUMENTS

| | | | |
|---|---|---|---|
| 2,702,813 | 2/1955 | Sullivan | 260/403 |
| 3,093,667 | 6/1963 | Fiala | 260/424 |
| 3,505,074 | 4/1970 | Pardun | 260/403 |
| 4,216,239 | 8/1980 | Gloppestad | 210/787 |
| 4,501,671 | 2/1985 | Bazell | 210/787 |
| 4,584,141 | 4/1986 | Paulitz et al. | 260/403 |
| 4,698,185 | 10/1987 | Dijkstra et al. | 260/403 |

FOREIGN PATENT DOCUMENTS

| | | | |
|---|---|---|---|
| 565061 | 10/1958 | Canada | 210/787 |

*Primary Examiner*—Peter Hruskoci
*Assistant Examiner*—Krisanne Shideler
*Attorney, Agent, or Firm*—Cushman, Darby & Cushman

[57] ABSTRACT

A three or optionally four stage process for the continuous removal of a gum phase from triglyceride oil is described in which in a first stage the oil containing a separate gum phase is subjected to centrifugal separation in a first centrifugal separator to yield gums with low oil content and an oil that still contains a fraction of the gums originally present in the feed, in a second stage the oil obtained from the first stage is subjected to centrifugal separation in a second centrifugal separator to yield oil with a further reduced residual gum content and a gum phase with a higher oil content than the gums obtained in the first stage, in a third stage the gum phase obtained in the second stage is recycled into the oil stream fed to the first centrifugal separator and optionally in a fourth stage the oil obtained in the second stage is washed one or more times with water.

8 Claims, No Drawings

PROCESS FOR THE CONTINUOUS REMOVAL OF A GUM PHASE FROM TRIGLYCERIDE OIL

BACKGROUND OF THE INVENTION

The invention relates to a process for the continuous removal of a gum phase from triglyceride oil resulting in gums with a low oil content and a degummed oil with a low content of gums. More particularly the invention relates to a degumming process which results in a very low refining loss of oil and in a preferred embodiment yields an oil that can be physically refined.

Crude triglyceride oils as obtained by pressing and/or extracting oil seeds or animal matter contain several compounds other than triglycerides. Some of these, such as diglycerides, tocopherols, sterols and sterol esters need not necessarily be removed during refining but other compounds such as phosphatides, free fatty acids, odors, colouring matter, waxes and metal compounds must be removed because they adversely affect taste, smell, appearance and keepability of the refined oil.

Several processes are known for the removal of these unwanted compounds and the phosphatides in particular. A commonly used process is the water degumming process during which water or steam (e.g. 3% for crude soy bean oil) is added to hot (e.g. 70° C.) crude oil as a result of which most of the phosphatides present in the crude oil are hydrated and form a separate phase. This phase can then be removed for which removal process disc centrifuges are commonly used. The sludge thus removed from the oil contains water, hydratable phosphatides, triglyceride oil and several other compounds such as meal particles and glycolipids of an as yet ill-defined nature. This sludge is commonly dried to yield commercial lecithin. Water degummed oil has the advantage over crude oil that it does not throw a deposit during transport and storage.

Water-degummed oil, however, still contains phosphatides, the so-called non-hydratable phosphatides (NHP) which must be removed during subsequent refining operations. British Patent 1 565 569 overcomes this problem of two stage phosphatide removal by adding an acid to the crude oil, allowing a contact time of approximately 10 min and then partially neutralizing this acid by a base, allowing an extended contact time for the development of a separate gum phase which is then separated from the oil either by gravity or centrifuge. Because of the transport and storage difficulties of crude oil, this process can only be carried out at a crushing plant which situation, on the other hand, has the advantage of providing a means of disposal of the gums thus obtained: They are passed to the meal desolventizer or are added to the meal being pelletized.

For the removal of NHP from water degummed vegetable oil a number of processes exist. In DE-AS 26 09 705 a process is described in which water degummed oil is treated with an acid and cooled to below 40° C. whereupon the NHP's form gums in a form that can be removed e.g. by centrifuge. In the specification it is noted that less acid is required if a crude oil is used instead of a water degummed oil, which discovery has led to another process as described in East German Patent 132 877 in which process lecithin is added to water degummed oil to facilitate the NHP removal.

Another process to remove NHP from water degummed oil is described in U.S. Pat. No. 4,698,185. In a first stage of this process a nontoxic aqueous acid, e.g. phosphoric acid, is finely dispersed in the water degummed oil and sufficient contact time is allowed to complete the decomposition of the metal salts of phosphatidic acid constituting the NHP. In a second stage a base is added to raise the pH above 2.5 without substantial formation of soap and in a third stage the aqueous phase containing the gums and the oil phase are separated.

However, to be economically viable, the above processes must ensure that (I) the oil content of the gums is as low as possible, because this oil content constitutes a refining loss, and (II) the gum content of the oil is as low as possible, especially when the degummed oil is to be physically refined subsequently. Several of the processes described above therefore recommend washing the oil with water after the gum separation stage. This washing process, however, has the disadvantage that it again leads to oil losses and may cause pollution and/or effluent disposal problems and still leads to an insufficiently low residual phosphatide content.

OBJECTS OF THE INVENTION

Therefore it is an object of the invention to provide a process for degumming triglyceride oils resulting in gums with a low triglyceride oil content and in degummed oils with a low residual gum content.

It is a further object of the invention to provide degummed oils that are amenable to being physically refined.

It is a further object of the invention to allow the use of normal amounts of bleaching earth prior to the physical refining of the degummed oils.

It is a further object of the invention to minimize or even eliminate aqueous effluents resulting from the washing of degummed oil and containing inadmissably high amounts of biodegradable matter.

It is a further object of the invention to allow the use of existing installations with a minimum of modification.

These and further objects will become apparent as the description of the invention proceeds.

DETAILED DESCRIPTION OF INVENTION

The invention is directed to a process for the continuous removal of a gum phase from trglyceride oil to produce gums with a low triglyceride oil content and a degummed oil with a low residual gum content.

The process according to the invention is a process for the continuous removal of a gum phase from triglyceride oil comprising the following stages:

(a) in a first stage the oil containing a separate gum phase is subjected to centrifugal separation in a first centrifugal separator to yield gums with low oil content and an oil that still contains a fraction of the gums originally present in the feed;

(b) in a second stage the oil obtained from stage (a) is subjected to centrifugal separation in a second centrifugal separator to yield oil with a further reduced residual gum content and a gum phase with a higher oil content than the gums obtained in stage (a);

(c) in a third stage the gum phase obtained in stage (b) is recycled into the oil fed to the first centrifugal separator; and (d) optionally in a fourth stage the oil obtained in stage (b) is washed one or more times with water.

The centrifugal separators to be used in the process according to the invention can be disc centrifuges, decanters or other equipment capable of continuously separating a gum phase from an oil phase. The performance of such equipment can commonly be adjusted to yield either a gum stream with low oil content or an oil stream with low gum content but in practice and at normal design throughput one piece of equipment cannot achieve both. Thus if such a piece of equipment is so adjusted to yield gums with a low and preferably minimum oil content (preferably less than 40% by weight, e.g. 5 to 40% by weight, calculated on dry matter), the oil phase leaving the equipment is found to contain a significant fraction of the gums that is not removed from the oil under those operating conditions.

Surprisingly it has now been found that this gum fraction can be removed by this first centrifugal separator after all when it is first removed from the oil stream by a second centrifugal separator that has been adjusted to yield oil of further reduced and preferably minimum residual gum content and then recycled to the oil stream fed to the first centrifugal separator and that no accumulation of this gum fraction occurs. The gums removed in the second centrifugal separator and recycled to the first centrifugal separator have a higher oil content than the gums removed by the first separator. In practice this oil content is mostly above 90% by weight or even more than 95% by weight, calculated on dry matter.

In addition it has been found that the amount of gums (usually 5 to 20% of the gums originally present) to be recycled reaches a steady state very soon after starting up the degumming process which steady state is hardly different from the situation observed immediately after start up.

The process according to the invention can advantageously be used in the degumming process according to U.S. Pat. No. 4,698,185. Thus if water degummed vegetable oils are treated with finely dispersed aqueous acid whereupon this acid is partially neutralized so that a gum phase is formed, and these oils containing a separate gum phase are processed according to the invention, the gums then isolated may contain as little as 35% or even 15% triglyceride oil after removal of water by drying, and the oils thus obtained may contain as little as 10 or even 5 or even less than 2 ppm phosphorus and less than 0.1 ppm iron.

Similarly the process according to the invention can be used to degum oils treated according to British Patent 1 565 569 and in doing so greatly improves the economics of this process especially in comparison with the separation by gravity as mentioned in this patent.

In the superdegumming process as described in DE-AS 26 09 705 the process according to the invention can advantageously be applied by avoiding the need to reheat the oil containing the gum phase and by further reducing the oil content of the separated gums.

After leaving the second separator the oil obtained according to the process of the present invention is usually washed one or more times with water, preferably in a countercurrent system. However, in case of subsequent alkali refining water washing can be omitted, i.e. the oil obtained in stage (b) can be directly subjected to the alkali refining treatment. On the other hand in case of physical refining prior water washing is required, i.e. stage (d) cannot be omitted (see below).

It is an advantage of the process according to the invention that for a given throughput the equipment can be reduced in size or nominal capacity or that for given equipment the capacity is increased by the process according to the invention. After all, if a centrifugal separator shows poor performance with respect to separation efficiency, it is common practice to increase the residence time of the particles to be separated and to subject the heavy phase for a longer period of time to centrifugal compaction by reducing the throughput. Because in the present invention the properties of only one of the phases are optimized in each centrifugal separator, the process is more robust and allows of higher throughput.

The oil to be degummed by the process according to the invention is not critical. Thus edible triglyceride oils like soy bean oil, sunflower seed oil, rape seed oil, palm oil and other vegetable oils as well as lard, tallow and especially fish oil can all be successfully treated provided the gum phase has been fully developed before the oil is fed to the first centrifugal separator.

Although the process according to the invention can be used for water degumming of crude oil, the greatest benefits arise when using the process according to the invention at the separating stage in a process aiming at almost complete removal of phosphatides and metals and yielding oil that is amenable to being physically refined. The combination of the process according to the invention and physical refining leads to the complete elimination of aqueous effluent having a high biological oxygen demand by producing only washing water containing a little inorganic salts and avoids the need for a soap splitting stage. By using the water for washing the oil in a countercurrent system with respect to the oil flow all effluent is effectively eliminated from the refining process.

The process according to the invention can use disc centrifuges, decanters or other equipment capable of continuously separating a gum phase from an oil phase. Decanters to be used in the process preferably contain a circular disc acting as seal prior to the conical section. Disc centrifuges used in the process according to the invention can employ a continuous and/or intermittent gum removal system and the continuous removal can be of a type employing a centrifugal pump and/or nozzles in the outer ring of the centrifugal bowl. The gum removal system commonly used consists of a centripetal pump or nozzles for continuous gum removal or of a temporary opening of the centrifugal bowl allowing accumulated solids to be discharged by partial desludging.

Preferably, the centrifugal equipment used in the process according to the invention rotates at high speed. Such high speeds increase the centrifugal force and thus facilitate the separation. Its use has the advantage of increasing the capacity for a given size and ensuring minimal oil content of the gums and, where desired, virtually gum free oil.

EXAMPLE 1

In this example the performance of a single stage gum phase removal will be described. The feed consisted of water-degummed soy bean oil with approximately 200 ppm residual phosphorus. The separate gum phase was established according to U.S. Pat. No. 4,698,185 using 0.20 vol % phosphoric acid of 80% strength, a contact time equal to 2.5 min and a 50% neutralization of the phosphoric acid by 12° Be caustic soda.

In the first set of experiments a self cleaning disc centrifuge (Westfalia Separator AG, Oelde, W.-Germany) was used as the first stage separator and two water washing solid bowl disc centrifuges (Westfalia Separator AG, Oelde, W.-Germany) were provided downstream, throughput was at nominal capacity. If a standard centripetal pump was used for gum phase discharge, this led to an 88% removal of the gums from the oil and a triglyceride content of the removed gums of 20% (calculated on dry matter).

Optimizing the centripetal pump led to an increase of the percentage of gums removed to 93%, without seriously affecting the oil content of the gum phase. A decrease in the oil outlet pressure as controlled by the disc centrifuge allowed the oil content of the gums to be lowered to 16% (calculated on dry matter) but caused more gums to remain in the processed oils (88% removal). Similarly, an increase in oil outlet pressure increased the gum phase removal to 96% but at the expense of an unacceptable increase (to 65%) of the triglyceride content of the gum phase.

The oil loss in the washing waters was also determined and this varied from a fully acceptable refining loss of 0.03% (calculated on oil input) when 96% of the gum phase was removed from the oil (optimized centripetal pump, high outlet pressure) to a totally unacceptable 0.27% when only 88% of the gums were removed (optimized centripetal pump, low outlet pressure).

In a second set of experiments a decanter was used as the first stage separator, followed again downstream by the same solid bowl washing centrifuges as in the first set of experiments. The separate gum phase was prepared as during the first set of experiments, be it at reduced throughput and somewhat increased contact time (4.5 min).

If this decanter was provided with long nozzles (77 mm, $\phi$ 200) a deep pond resulted allowing efficient decantation of the gum phase and 96% removal of this phase, but then the hydraulic force ensuring the flow of gums towards the decanter solid phase outlet was so large that the oil content of the gums reached an unacceptable high level of 70% (calculated on dry matter). Decreasing the nozzle length (to 70 mm, $\phi$ 214) did indeed lower the triglyceride oil content of the gums to 32% but simultaneously the gum phase removal dropped to 85% causing high triglyceride losses during the washing stages (0.35% calculated on oil input). Similarly, the residual phosphorus content after the two washing stages increased from 5.1 ppm (long nozzles) to 14.2 ppm (short nozzles), indicating that water-washing is not an effective step for the removal of the last traces of residual gums.

In a third set of experiments a solid bowl disc centrifuge was used as first separator in soy bean oil again at reduced throughput. Two different top discs around which the gum phase must travel before reaching the centripetal pump were used. When a standard top disc was used the gums were easily extracted leading to 94% removal. The oil content of the gum phase was, however, unacceptably high at 85% (calculated on dry matter). This oil content could be lowered to 40% by the use of a modified top disc but this immediately lowered the percentage of gums removed to 87% and increased the refining loss on the washing stages to 0.23%.

The following table summarizes the experimental data.

| set experiments | 1 | 1 | 1 | 1 | 2 | 2 | 3 | 3 |
|---|---|---|---|---|---|---|---|---|
| centripetal pump | stand. | opt. | opt. | opt. | — | — | — | — |
| outlet pressure | norm. | norm. | low | high | — | — | — | — |
| nozzle length | — | — | — | — | long | short | — | — |
| top disc | — | — | — | — | — | — | standard | modified |
| P content crude oil (ppm) | 200 | 202 | 206 | 206 | 194 | 198 | 198 | 196 |
| gum removal (%) | 88 | 93 | 88 | 96 | 96 | 85 | 94 | 87 |
| oil content gums (%) | 20 | 22 | 16 | 65 | 70 | 32 | 85 | 40 |
| refining loss (%) | 0.20 | 0.18 | 0.27 | 0.04 | 0.17 | 0.35 | 0.15 | 0.23 |
| residual P content after washing twice (ppm) | 11.1 | 8.0 | 12.3 | 6.0 | 5.1 | 14.2 | 8.1 | 12.6 |

From these examples it can be concluded that the equipment used is not capable of achieving both a low oil content in the gums and a low residual gum content in the separated oil (and thus a low refining loss on washing and a low residual phosphorus content after two water washing stages) simultaneously. If by changes to the equipment or its operating conditions one of the product stream parameters was improved, the other invariably was found to deteriorate and an economically viable one-stage process could not be established.

EXAMPLE 2

In this example, the process according to the invention will be illustrated. Water degummed soy bean oil with a phosphorus content of 156 ppm was used as starting material and the separate gum phase was generated according to the conditions given in Example 1 at a reduced throughput.

The first separator used in this experiment was a solid bowl disc centrifuge provided with the standard top disc. As in Example 1 only 85% of the gums present in the feed were removed from the oil stream and the oil content of the gums calculated on dry matter was 38%. When the oil with the residual gums was washed twice with water this led to an additional refining loss of 0.21% (calculated on oil input).

When, however, the oil with the residual gums was fed to a self cleaning disc centrifuge, in which the bowl had been provided with nozzles for continuous gum discharge, high oil content gums were separated from the oil stream. This side stream was recycled (in this instance to the crude oil supply tank) and the main oil stream was washed two times with water. As a result, the refining loss decreased from 0.21% to 0.05% (calculated on oil input) and the residual phosphorus content of the washed oil was only 4.6 ppm.

Steady operation was observed and no signs of accumulation of the gum fraction that had not been removed by the first separator could be observed. Occasionally, a marked increase in gums in the wash waters was noticed but this deterioration of performance could be redressed by feeding water to the second separator as a result of which the nozzles, that had become blocked, were cleared.

EXAMPLE 3

In this example two self cleaning disc centrifuges were used to illustrate the process according to the invention. In the first part of the experiment, however, only one such centrifuge was used for comparative purposes. It was provided with an optimized centripetal pump (see Example 1) and operated at normal pressure. The water degummed soy bean oil had a phosphorus content of 149 ppm, the gum phase was established using the conditions given in Example 1.

The performance observed was quite similar to the one summarized in the second column of the table in Example 1 in that 94% of the gums present in the feed were removed, the triglyceride content of the gums was 26% and the combined refining loss in the washing stages was 0.16%. Residual phosphorus in the washed oil was 7.0 ppm.

In the second part of this experiment the oil leaving the first separator was fed to a second self-cleaning disc centrifuge in which the solids discharge cycle was varied between once every 1 to 4 min. The discharge was in this stage not recycled and thus constituted an unacceptable refining loss but during the short period of time this experiment was allowed to continue an improvement in refining loss on water washing to 0.09% was observed. In addition, the residual phosphorus content of the washed oil decreased to 5.4 ppm.

Further improvements in refining loss and residual phosphorus content could be attained by using the process according to the invention, which process in addition eliminated the unacceptable loss due to the frequent solids discharge from the second centrifuge. To this end, the second separator was provided with nozzles for continuous gum discharge and the high oil content gums thus separated were recycled into the feed of the first separator, thus decreasing the net throughput to approximately 85%. This mode of operation could be maintained continuously without noticeable build-up of gums or shift in performance and led to a refining loss on washing of only 0.04% (calculated on oil input) and a residual phosphorus content of only 3.8 ppm. Apparently, the continuous gum removal from the second separator leads to a more steady operation and improved separation efficiency in comparison with the intermittent shot cycle as practiced during the second part of the experiment.

EXAMPLE 4

In this example a decanter provided with short nozzles was used as the first separator. The water degummed soy bean oil used in this example has a residual phosphorus content of only 96 ppm. The gum phase was established as in Example 1.

The decanter removed 86% of the gums present in the feed and the triglyceride oil content of the gums was 29%. If the oil leaving the decanter was fed to the washing centrifuges, a refining loss of 0.20 during washing was noted and the residual phosphorus content of the washed oil was 8.1 ppm.

When applying the process according to the invention, the oil leaving the decanter was fed to a super clarifying disc centrifuge provided with nozzles, before being washed two times with water. The oil-rich gums separated by this super clarifier were recycled resulting in a net throughput of about 80%. The oil processed according to the invention had, after water-washing, a residual phosphorus content of only 3.2 ppm and the refining loss on washing had decreased to 0.03% (calculated on oil input).

EXAMPLE 5

This example illustrates the combination of the self cleaning disc centrifuge as the first separator and the super clarifying disc centrifuge as the second separator at a feed rate of nominal capacity. Soy bean oil with a residual phosphorus content of 110 ppm was used and the gum phase was established as in Example 1.

The self cleaning disc centrifuge was provided with an optimized centripetal pump and operated at slightly below normal outlet pressure. Accordingly, 90% of the gums fed to this centrifuge were removed and the oil content of the gums was 19% (calculated on dry matter). When the oil leaving this first separator was washed with water, a residual phosphorus content of 7.3 ppm was observed.

As in Example 3, the oil was fed to a second centrifuge operating a solids discharge cycle for a short period but in the present example a super clarifying disc centrifuge was used for this purpose. This decreased the refining loss on washing from 0.17% to 0.08% and the residual phosphorus content after washing from 7.3 ppm to 5.6 ppm.

Using then the process according to the invention, the super clarifying disc centrifuge was provided with nozzles for continuous gum discharge as a result of which an oil-rich gum phase was isolated, which stream was recycled. The flow rate of this recycled stream led to a reduced net throughput of about 83%. As a result of this change-over to the process according to the invention the refining loss on washing dropped further to 0.02% and the residual phosphorus content in the washed oil was found to be reduced to 3.4 ppm.

The above examples clearly illustrate the benefits accuring from the process according to the invention. By using a first separator (a disc centrifuge or a decanter) in such a mode of operation that the triglyceride content of the gum phase emerging from this separator is as low as possible, the oil loss in this stage is minimized. By then using a second separator, preferably with a continuous system of gum removal and recycling the oil-rich gum phase according to the invention, refining losses at the subsequent washing stages are minimized so that the overall oil losses are minimal indeed. In addition, oils processed in this manner are amenable to physical refining as will be illustrated in the next example.

EXAMPLE 6

Water degummed soy bean oil was processed according to Example 5, washed twice with slightly acidified water (pH 3 to 4) to avoid soap formation during the washing operation and dried under vacuum, until an amount of 400 tons had been collected. This oil had a free fatty acid content of 0.38%, a moisture content of 0.05%, a residual phosphorus content of 4.0 ppm, a residual iron content of 0.07 ppm, an extinction at 268 nm of 0.22 and at 232 nm of 2.0 and an anisidine value of 0.5.

This lot was split into two parts, one part being chemically neutralized to a free fatty acid content of 0.03%, bleached and deodorized, the other part being just bleached and physically refined. Bleaching conditions were identical for both lots and employed 0.44% wt % bleaching earth (Tonsil ACCFF, Süd Chemie, Munich, W.-Germany) at the same temperature (approximately 100° C.). The continuous deodorization process was carried out at a throughput of 25 tons/hr whereas in the physical refining process the equipment (Eisenbau Essen, W.-Germany) and the operating conditions were the same but throughput was reduced to 18 tons/hr. Samples were taken at hourly, 2-hourly or 4-hourly intervals and analized to arrive at the data summarized in the following table.

| | degummed | after | after bleaching | | after deodorization | after physical refining |
|---|---|---|---|---|---|---|
| | starting material | chemical neutral. | degummed material | chemical neutral. | degummed material | chemical neutral. |
| free fatty acid (%) | 0.38 | 0.03 | 0.38 | 0.05 | 0.02 | 0.02 |
| phosphorus content (ppm) | 4.0 | 1.3 | 1.0 | 0.9 | 1.3 | 0.8 |
| iron content (ppm) | 0.07 | 0.03 | 0.05 | 0.03 | 0.04 | 0.06 |
| extinction 268 nm | 0.22 | 0.14 | 1.22 | 1.29 | 1.20 | 1.24 |
| extinction 232 nm | 2.0 | 2.1 | 2.0 | 2.2 | 4.4 | 4.5 |
| amisidine value | 0.5 | 1.0 | 1.7 | 2.2 | 1.2 | 1.5 |
| peroxide value | | | | | 0.3 | 0.1 |
| color (4¼") | | | | | 0.7/4 | 0.6/4 |
| taste: - fresh | | | | | 8.5/10 | 8.5/10 |
| after 1 week | | | | | 8.5/10 | 8.5/10 |
| after 2 weeks | | | | | 8.0/10 | 8.0/10 |
| after 4 weeks | | | | | 8.0/10 | 8.0/10 |

This table illustrates that the soy bean oil can be physically refined to yield an oil that is equally stable as oil that has been chemically neutralized, while using the same amount of bleaching earth. This means that the oil loss during the bleaching stage is the same in both cases.

An additional major advantage of the process according to the invention followed by physical refining lies in the fact that this refining process does not lead to effluent problems. During the gum removal stage all gums are removed from the oil so that the washing waters only contain a small part of the chemicals used to form the gums as a separate phase and during the physical refining stage the free fatty acids and odors are recovered as a distillate, thus avoiding a soap splitting operation with its concomitant effluent problems.

EXAMPLE 7

Rape seed oil with a phosphorus content of 219 ppm was treated according to the process of U.S. Pat. No. 4,698,185 using 0.18 vol % phosphoric acid of 80% strength, a contact time equal to 2.5 min and a 60% neutralization of the phosphoric acid by 12° Be caustic soda. The oil used was not (completely) water-degummed because its phosphorus content dropped to 98 ppm when a sample of the oil was degummed with water in the laboratory.

The procedure as described in Example 5 was used. The first separator removed 91% of the gums fed to this centrifuge and the oil content of the gums was 28% (calculated on dry matter). When this oil was washed twice with water this operation led to a refining loss of 0.16% and the residual phosphorus content of the washed oil was 12.9 ppm.

Using then the process according to the invention, the super clarifying disc centrifuge was provided with nozzles, resulted in an oil-rich gum phase which was recycled. As a result, the refining loss on washing dropped from the original 0.16% to less than 0.02 wt. % (as calculated on oil input) and the residual phosphorus content dropped from 12.9 ppm to 6.2 ppm.

The above example clearly illustrates that the process according to the invention is not limited to water-degummed oils and that other oils than soy bean oil can also benefit from the process according to the invention and lead to degummed oils that are amenable to physical refining.

EXAMPLE 8

Example 7 was repeated using sunflower seed oil with a residual phosphorus content of 93 ppm, which level fell to 41 ppm after water degumming a sample in the laboratory. The amount of phosphoric acid used was reduced to 0.15 vol % and the amount of caustic soda used was reduced even further to attain a 55% neutralization of the phosphoric acid.

The first separator (self cleaning disc centrifuge with an optimized centripetal pump) removed 81% of the gums present in the feed and the gum phase contained 21% triglyceride oil as calculated on its dry matter. Washing the oil leaving the first separator twice with water led to a refining loss of 0.16 wt % as calculated on the feed and to a washed oil with 12.4 ppm residual phosphorus.

Applying the process according to the invention by using the same second separator as in Examples 5 and 7 led to a gum stream which was recycled and a washed sunflower oil with only 4.8 ppm of phosphorus. The refining loss during the washing stages fell from 0.16 wt. % to less than 0.04 wt %.

We claim:

1. A process for the continuous removal of a gum phase from triglyceride oil comprising the following stages:

(a) in a first stage the oil containing a separate gum phase is subjected to centrifugal separation in a first centrifugal separator to yield gums with low oil content and an oil that still contains a fraction of the gums originally present in the feed;

(b) in a second stage the oil obtained from stage (a) is subjected to centrifugal separation in a second centrifugal separator to yield oil with a further reduced residual gum content and a gum phase with a higher oil content than the gums obtained in stage (a);

(c) in a third stage the gum phase obtained in stage (b) is recycled into the oil stream fed to the first centrifugal separator; and (d) optionally in a fourth stage the oil obtained in stage (b) is washed one or more times with water.

2. Process according to claim 1, wherein the first centrifugal separator in stage (a) is operated in such a manner that gums with an oil content of less than 40% by weight, calculated on dry matter, are obtained.

3. Process according to claim 1, wherein the separate gum phase is developed by acid treatment of the triglyceride oil.

4. Process according to claim 1, wherein the separate gum phase is developed by acid treatment of the triglyceride oil and subsequent partial neutralization.

5. Process according to claim 1, wherein in stage (c) the gum phase obtained from stage (b) is recycled to the crude oil supply tank.

6. Process according to claim 1, wherein in stage (d) the oil obtained from stage (b) is washed with water in a countercurrent system.

7. Process according to claim 1, wherein the oil obtained in stage (b) is directly subjected to alkali refining without prior water washing.

8. Process according to claim 1, wherein the oil obtained in stage (d) is subjected to physical refining.

* * * * *